(12) United States Patent
Powell et al.

(10) Patent No.: US 11,428,670 B2
(45) Date of Patent: Aug. 30, 2022

(54) APPLICATION OF ULTRASONIC INSPECTION TO DOWNHOLE CONVEYANCE DEVICES

(71) Applicant: Halliburton Energy Services, Inc., Houston, TX (US)

(72) Inventors: Bryan D. Powell, Van Alstyne, TX (US); Anthony Phan, Lewisville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 56 days.

(21) Appl. No.: 16/652,285

(22) PCT Filed: Dec. 18, 2017

(86) PCT No.: PCT/US2017/066946
§ 371 (c)(1),
(2) Date: Mar. 30, 2020

(87) PCT Pub. No.: WO2019/125354
PCT Pub. Date: Jun. 27, 2019

(65) Prior Publication Data
US 2020/0240956 A1 Jul. 30, 2020

(51) Int. Cl.
E21B 47/00 (2012.01)
G01N 29/22 (2006.01)
(Continued)

(52) U.S. Cl.
CPC .......... G01N 29/041 (2013.01); E21B 47/00 (2013.01); G01N 29/221 (2013.01); E21B 17/20 (2013.01);
(Continued)

(58) Field of Classification Search
CPC ..... E21B 47/00; E21B 47/002; G01N 29/041; G01N 29/221; G01N 29/043;
(Continued)

(56) References Cited

U.S. PATENT DOCUMENTS

| 4,020,688 A | 5/1977 | Hauldren |
| 6,405,798 B1 * | 6/2002 | Barrett ................... E21B 23/00 166/250.01 |

(Continued)

FOREIGN PATENT DOCUMENTS

| EP | 1047935 B1 | 8/2005 | |
| WO | WO 2008086463 | * 7/2008 | ............. G01N 29/07 |
| WO | 2015152928 A1 | 10/2015 | |

Primary Examiner — Jacques M Saint Surin
(74) Attorney, Agent, or Firm — John W. Wustenberg; Parker Justiss, P.C.

(57) ABSTRACT

Provided is a method for inspecting at least a portion of a downhole conveyance device. The method, in one embodiment, includes providing a downhole conveyance device, and providing an ultrasonic defect inspection system adjacent the downhole conveyance device. The method, in this embodiment, further includes detecting defects in the downhole conveyance device using the ultrasonic defect inspection system, wherein the detecting includes transmitting ultrasonic waves from the ultrasonic defect inspection system toward the downhole conveyance device, and obtaining defect data by sensing disruptions in the reflected ultrasonic waves caused by defects in the downhole conveyance device.

20 Claims, 4 Drawing Sheets

(51) Int. Cl.
  *G01N 29/04* (2006.01)
  *E21B 17/20* (2006.01)
(52) U.S. Cl.
  CPC ........... *G01N 2291/0231* (2013.01); *G01N 2291/0234* (2013.01); *G01N 2291/0235* (2013.01); *G01N 2291/0422* (2013.01)
(58) Field of Classification Search
  CPC ... G01N 2291/2636; G01N 2291/0234; G01N 2291/0422; G01N 2291/044; G01N 2291/0425; G01N 2291/0235
  USPC .......................................................... 73/588
  See application file for complete search history.

(56) References Cited

U.S. PATENT DOCUMENTS

| | | | |
|---|---|---|---|
| 6,446,718 B1 * | 9/2002 | Barrett | E21B 23/00 166/250.01 |
| 7,082,822 B2 * | 8/2006 | Harthorn | E21B 47/001 73/152.57 |
| 7,104,125 B2 * | 9/2006 | Harthorn | E21B 47/002 73/152.57 |
| 7,234,347 B2 * | 6/2007 | Harthorn | G01N 29/225 73/152.57 |
| 7,552,631 B2 * | 6/2009 | Harthorn | E21B 47/001 73/152.57 |
| 7,660,197 B2 * | 2/2010 | Barolak | G01N 29/07 367/35 |
| 8,044,821 B2 * | 10/2011 | Mehta | E21B 47/12 340/855.7 |
| RE43,960 E * | 2/2013 | Barolak | E21B 47/007 367/35 |
| 8,958,994 B2 | 2/2015 | Padilla et al. | |
| 9,322,807 B2 | 4/2016 | Lu et al. | |
| 9,879,525 B2 * | 1/2018 | Morrow | E21B 47/007 |
| 2006/0010914 A1 | 1/2006 | Costanzo | |
| 2010/0052670 A1 | 3/2010 | Kwun et al. | |
| 2010/0148766 A1 | 6/2010 | Weischedel | |
| 2013/0141100 A1 | 6/2013 | Labib et al. | |
| 2016/0327675 A1 | 11/2016 | Donderici | |
| 2017/0167949 A1 | 6/2017 | Xia et al. | |

* cited by examiner

APPLICATION OF ULTRASONIC INSPECTION TO DOWNHOLE CONVEYANCE DEVICES

CROSS-REFERENCE TO RELATED APPLICATION

This application is the National Stage of, and therefore claims the benefit of, International Application No. PCT/US2017/066946 filed on Dec. 18, 2017, entitled "APPLICATION OF ULTRASONIC INSPECTION TO DOWNHOLE CONVEYANCE DEVICES," which was published in English under International Publication Number WO 2019/125354 on Jun. 27, 2019. The above application is commonly assigned with this National Stage application and is incorporated herein by reference in its entirety.

BACKGROUND

Downhole conveyance devices are often employed to deliver a tool string downhole in a well system. For example, a downhole conveyance device can be a wire (e.g., wireline, slickline, and/or other downhole cable) or coiled tubing for withstanding the dynamic and static weight of the downhole tool string. As the downhole conveyance devices evolve with advances in the industry, an improved nondestructive method for their inspection is needed.

BRIEF DESCRIPTION

Reference is now made to the following descriptions taken in conjunction with the accompanying drawings, in which.

DETAILED DESCRIPTION

Figure 1:
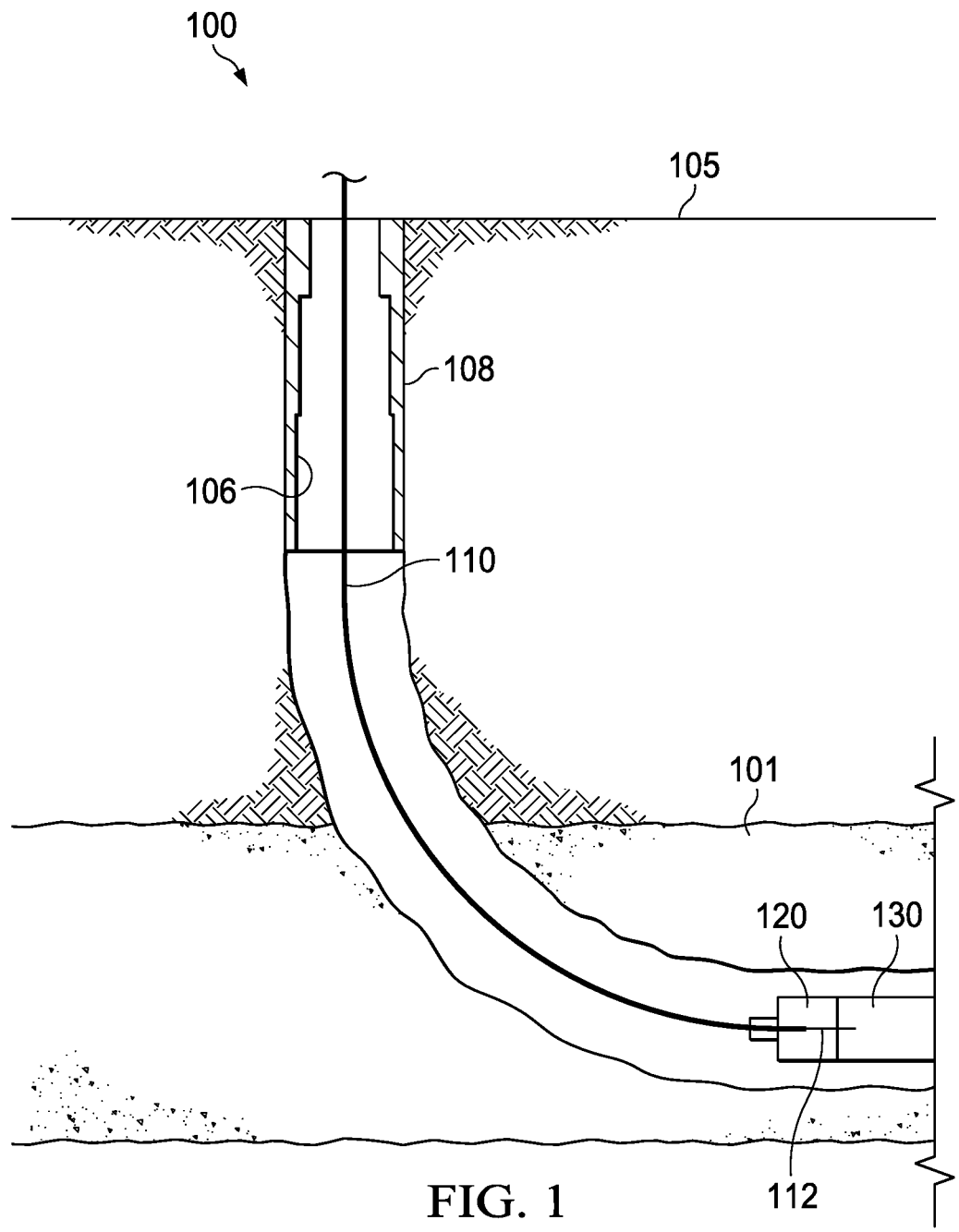
FIG. 1 illustrates a schematic cross-sectional side view of a well system for use with a downhole conveyance device.

FIG. 1 is a schematic cross-sectional side view of a well system 100 for use with a downhole conveyance device 110. The term downhole conveyance device, as used herein, is intended to encompass all types of downhole carriers and/or downhole cables, including, without limitation, slicklines, wirelines, electric lines, and coiled tubing. The well system 100 is provided for convenience of reference only, and it should be appreciated that the concepts herein are applicable to a number of different configurations of well systems.

The well system 100 includes a wellbore 108 that extends from a terranean surface 105 through one or more subterranean zones of interest 101. In FIG. 1, the wellbore 108 initially extends vertically and transitions horizontally. In other instances, the wellbore 108 can be of another orientation, for example, deviating to horizontal in the subterranean zone 101, entirely substantially vertical or slanted, or even deviating in another manner than horizontal, multilateral, and/or of another position.

At least a portion of the illustrated wellbore 108 may be lined with a casing 106, constructed of one or more lengths of tubing, which extend from the terranean surface 105, downhole, toward the bottom of the wellbore 108. The casing 106 provides radial support to the wellbore 108 and seals against unwanted communication of fluids between the wellbore 108 and surrounding formations. Here, the casing 106 ceases at or near the subterranean zone 101 and the remainder of the wellbore 108 is an open hole, e.g., uncased. In other instances, the casing 106 can extend to the bottom of the wellbore 108 or can be provided in another position and in multiple circumferences or thicknesses (e.g., conductor casing, surface casing, intermediate casing, production casing, or otherwise).

As illustrated, a downhole tool string 130 (e.g., one or more downhole tools) may be coupled to (e.g., supported by) the downhole conveyance device 110 through a connector 120. In the illustrated embodiment, the downhole conveyance device 110 includes a wire (e.g., a single wire such as slickline, or a solid wire) and a communication line 112. The communication line 112 is coupled with the wire such as, for example, embedded in, intertwined with one or more wires, or wrapped around or within one or more wires, in a non-linear (e.g., undulating, helical, zig-zag, or otherwise) configuration.

In some implementations, the downhole conveyance device 110 supports the downhole tool string 130 and can communicate instructions, data, and/or logic between the downhole tool string 130 and the terranean surface 105 through the communication line 112 (e.g., optical fiber, metallic conductor, or non-metallic conductor). In some examples, the downhole tool string 130 may communicate with computing systems or other equipment at the surface 105 using the communication capabilities of the downhole conveyance device 110. For example, the downhole tool string 130 may send and receive electrical signals and/or optical signals (e.g., data and/or logic) through respective conductor wire and/or fiber optics of the communication line within the downhole conveyance device 110. In addition, the downhole tool string 130 may be lowered or raised relative to the wellbore 108 by respectively extending or retrieving the downhole conveyance device 110.

In some implementations, the downhole conveyance device 110 is a slickline, a coated slickline, a composite slickline, or even a wireline. Similarly, the downhole conveyance device 110 can be formed from a metallic or non-metallic material, such as a composite material (e.g., polyphenylene sulfide or other organic polymer, high-performance thermoplastic, ceramic, carbon fiber or otherwise), as well as may be coated, for example with a thermoplastic coating such as Teflon® or PEEK (e.g., polyetheretherkeytone), among other coatings.

With the forgoing well system 100 in mind, and more particularly the downhole conveyance device 110 in mind, the present disclosure recognizes that current destructive and non-destructive methods for inspecting downhole conveyance devices for oil/gas purposes are subpar. Specifically, the present disclosure recognizes that current inspection techniques are incapable of quickly and accurately inspecting the downhole conveyance devices for nicks, cuts, pitting, etc., particularly where non-metallic or coated downhole conveyance devices are being used.

The present disclosure has, thus, determined that ultrasonic inspection of the downhole conveyance devices remedy many of the problems of the existing techniques. Specifically, the present disclosure has determined that such ultrasonic inspection can be applied to standard metallic, coated metallic, and coated non-metallic downhole conveyances devices to quickly and accurately inspect for defects. Traditional ultrasonic testing, often referred to as transverse (e.g., substantially perpendicular to a length (l) of the device being tested) ultrasonic inspection, uses an ultrasonic transducer to introduce ultrasonic waves through the thickness of the object to be inspected. The disruption of these reflected ultrasonic waves by defects in the material can be detected by the inspection equipment, and thus be used to recognize defects (e.g., defects in one or more downhole conveyance devices).

Figure 2:
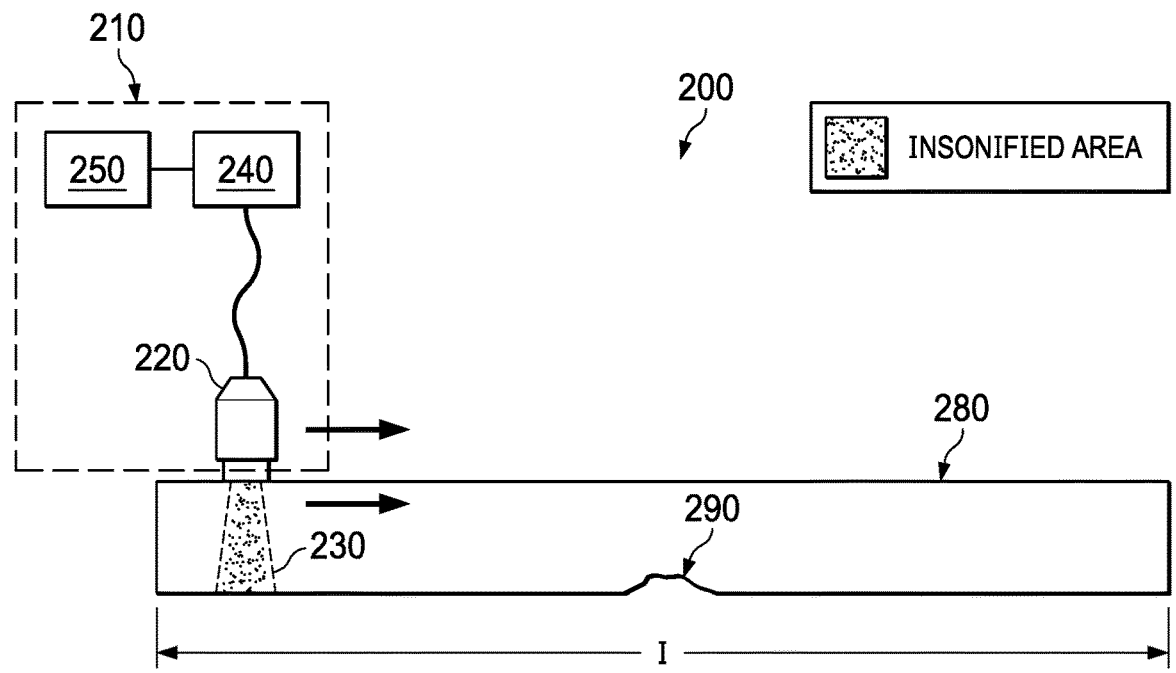
FIG. 2 illustrates one embodiment of a system for inspecting a downhole conveyance device.

FIG. 2 illustrates one embodiment of a system 200 for inspecting a downhole conveyance device. In the particular embodiment of FIG. 2, the system 200 includes an ultrasonic defect inspection system 210, as well as downhole conveyance device 280 having a length (l). The ultrasonic defect inspection system 210, in this embodiment, includes an ultrasonic transducer 220 that is configured to transmit/receive ultrasonic waves 230 toward/from the downhole conveyance device 28G. Accordingly, in one embodiment of the disclosure, the ultrasonic transducer 220 functions as an ultrasonic transmitter/receiver.

Coupled to the ultrasonic transducer 220, in the embodiment of FIG. 2, is a processor 240 and memory 250. The processor 240 includes the necessary logic to communicate with the ultrasonic transducer 220 and the memory 250, and perform the functions described herein. The memory 250 can be a conventional, non-transitory computer readable medium. The memory 250 can also be non-volatile storage, and/or memory of a server. The memory 250 can be configured to store a series of operating instructions that direct the operation of the processor 240 when initiated. The operating instructions can correspond to an algorithm or algorithms that cause the ultrasonic transducer 220 to operate in its intended fashion, including transmitting the ultrasonic waves 230 from the ultrasonic defect inspection system 210 toward the downhole conveyance device 280, and obtaining defect data by sensing disruptions in the reflected ultrasonic waves caused by defects in the downhole conveyance device 280.

The downhole conveyance device 280, in accordance with the disclosure, may comprise a slickline, wireline, and/or coil tubing, among other configurations. In one embodiment, the downhole conveyance device 260 is a slickline, and more particularly a metallic slickline or composite slickline (e.g., a carbon fiber slickline). Additionally, the slickline may be coated, for example using a thermoplastic coating such as Teflon® or PEEK (e.g., polyetheretherkeytone), among others. When the slickline is coated, the ultrasonic defect inspection system 210 may be used to sense disruptions in the reflected ultrasonic waves caused by coating loss, coating debonding or longitudinal cracking in the coating, as well as defects in the slickline itself.

In the embodiment of FIG. 2, the ultrasonic waves 230 are transversely introduced into the downhole conveyance device 280 using the ultrasonic transducer 220. In accordance with this method, the ultrasonic transducer 220 and/or downhole conveyance device 280 are moved in relation to one another to detect one or more defects 290 in the downhole conveyance device 280. In most embodiments, the downhole conveyance device 280 is moved in relation to a fixed ultrasonic transducer 220.

The present disclosure has further determined that guided wave ultrasonic inspection, which applies ultrasonic waves along the length (l) of the downhole conveyance device to be inspected, is capable of obtaining improved inspection results as well. In fact, guided wave ultrasonic inspection is capable of achieving even better inspection coverage over the length and cross-section of the downhole conveyance device than transverse ultrasonic testing. For example, any change in the downhole conveyance device's performance as a waveguide (e.g., such as coating loss, coating debonding, coating damage, surface defects or core defects), regardless of where the defect is located around a circumference of the downhole conveyance device, can be detected. Thus, the guided wave ultrasonic inspection need not be conducted directly across from the defect, such as might be the case for transverse ultrasonic inspection.

Figure 3:
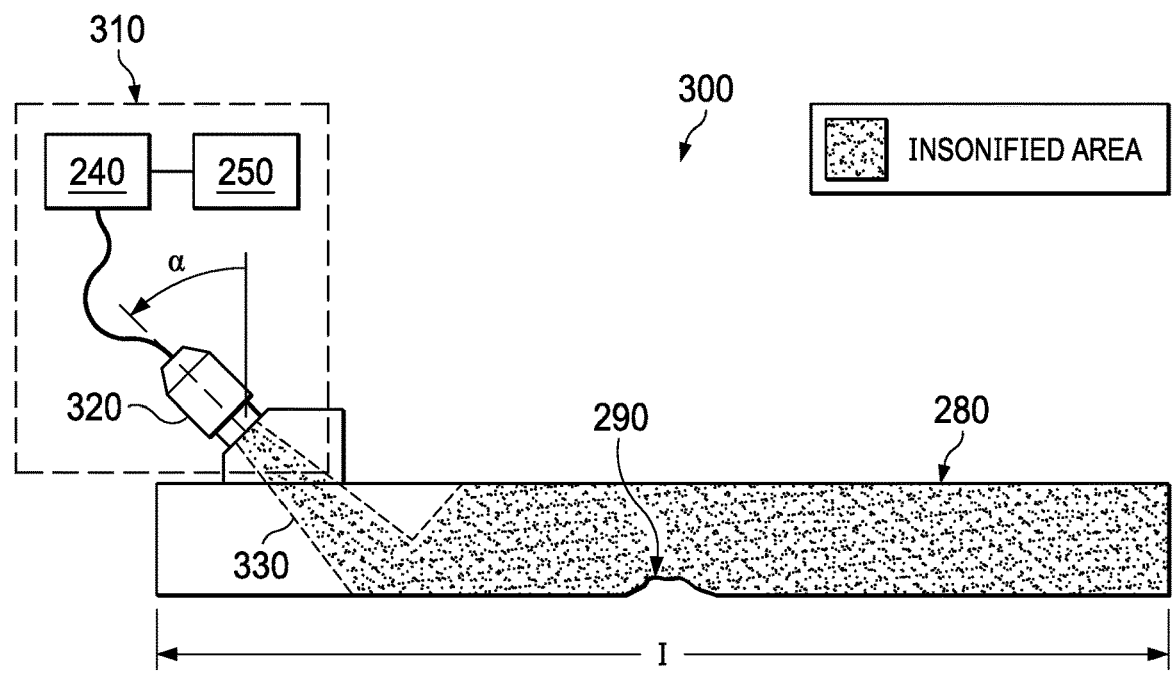
FIG. 3 illustrates an alternative embodiment of a system for inspecting a downhole conveyance device.

FIG. 3 illustrates an alternative embodiment of a system 300 for inspecting a downhole conveyance device 280. The system 300 of FIG. 3 shares many similar features as the system 200 of FIG. 2. Accordingly, like features maintain similar reference numerals. In contrast to the ultrasonic defect inspection system 210 of FIG. 2, the ultrasonic defect inspection system 310 of FIG. 3 includes an ultrasonic guided wave transducer 320. In this embodiment, the ultrasonic guided wave transducer 320 transmits guided ultrasonic waves 330 toward the downhole conveyance device 280, thereby turning the downhole conveyance device 280 into a waveguide. In one embodiment, the ultrasonic guided wave transducer 320 transmits the guided ultrasonic waves 330 toward the downhole conveyance device 280 at an angle ($\alpha$) of at least about 10 degrees from perpendicular to a length (l) of the downhole conveyance device 280, and yet in another embodiment at an angle ($\alpha$) of at least about 25 degrees.

In accordance with the embodiment of FIG. 3, the ultrasonic guided ultrasonic transducer 320 and/or downhole conveyance device 280 need not always be moved in relation to one another to detect one or more defects 290 in the downhole conveyance device 280. In fact, depending on the downhole conveyance device 280 material, the guided ultrasonic waves 330 may travel many tens of meters along the length (l) of the downhole conveyance device 280 without relational movement thereof. Accordingly, inspection rates of upwards of about 30 meters/minute, and better yet inspection rates of upwards of about 75 meters/minute, are easily achievable using ultrasonic guided ultrasound transducers 320.

Figure 4:
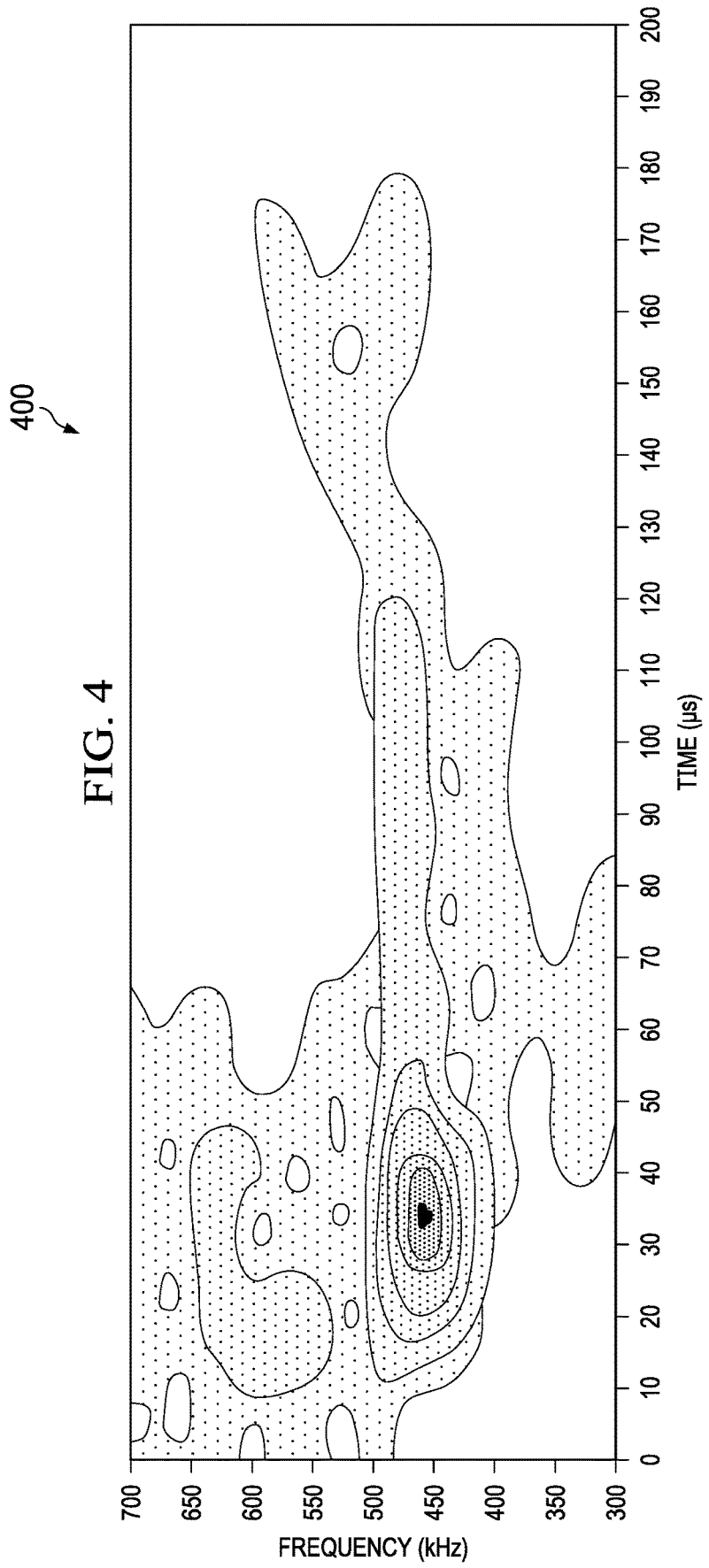
FIG. 4 illustrates an image depicting the existence of a defect as might be found on a downhole conveyance device using an ultrasonic defect inspection system manufactured and operated in accordance with the disclosure.

Turning briefly to FIG. 4, illustrated is an image 400 depicting the existence of a defect, such as the defect 290 of FIG. 3, as might be found on a downhole conveyance device, such as the downhole conveyance device 280 of FIG. 3, using an ultrasonic defect inspection system manufactured and operated in accordance with the disclosure. For point of reference, such an ultrasonic defect inspection system may be purchased from GuidedWave, Inc., which may be found at 450 Rolling Ridge Dr., Bellefonte, Pa. 16823. Given the foregoing disclosure, one skilled in the art would be well equipped to detect for defects as disclosed above.

Figure 5:
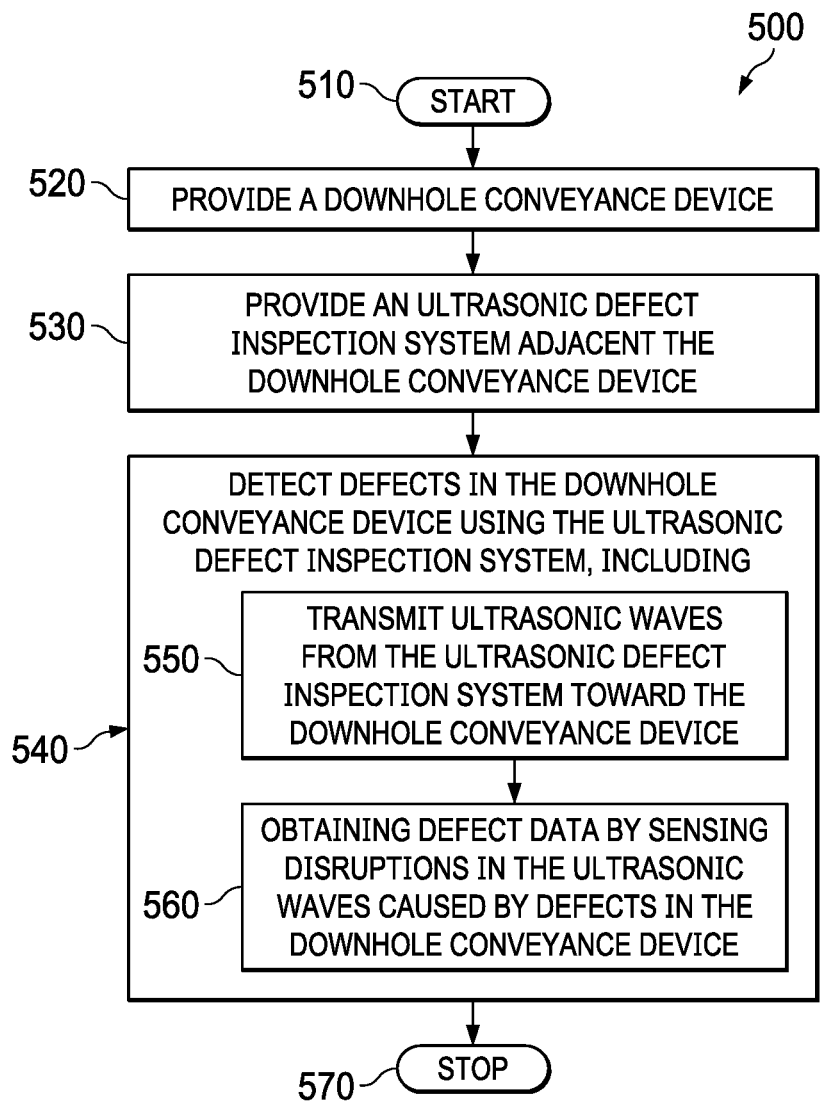
FIG. 5 illustrates a method for inspecting at least a portion of a downhole conveyance device, as provided in one embodiment of the disclosure

Turning to FIG. 5, illustrates is a method for inspecting at least a portion of a downhole conveyance device 500, as provided in one embodiment of the disclosure. The method 500 begins in a start, step 510. Thereafter, in a step 520, a downhole conveyance device is provided for inspection. The downhole conveyance device may be at its final stages of manufacture, may be in the shop for repair, or alternatively may be tripping into and out of the well system, among other locations. Similarly, the downhole conveyance device may be partially or entirely in elongated form, or alternatively may be partially or entirely located on a spool for containment, storing and/or transport thereof. Furthermore, in a step 530, an ultrasonic inspection system (e.g., in one embodiment similar to the ultrasonic inspection system disclosed above with regard to FIGS. 2 and 3) is provided adjacent the downhole conveyance device.

With the ultrasonic defect inspection system in place, defects in the downhole conveyance device may be detected in a step 540. In accordance with the disclosure, step 540 may include a sub step 550 of transmitting ultrasonic waves from the ultrasonic defect inspection system toward the downhole conveyance device, as well as a sub step 560 of obtaining defect data by sensing disruptions in the reflected ultrasonic waves caused by defects in the downhole conveyance device. The method could end in a stop step 570.

In accordance with one embodiment of the disclosure, the guided ultrasonic waves are transmitted toward the downhole conveyance device thereby turning the downhole conveyance device into a waveguide. For instance, the guided ultrasonic waves could be transmitted toward the downhole conveyance device at an angle ($\alpha$) of at least about 10 degrees, or in another embodiment an angle ($\alpha$) of at least about 25 degrees. In yet another embodiment, transverse ultrasonic waves are transmitted toward the downhole conveyance device. In accordance with these embodiments, particularly the use of guided ultrasonic waves, defects may be detected in the downhole conveyance device at a rate upwards of about 30 meters/minute, and in certain embodiment a rate upwards of about 30 meters/minute. In other embodiments, the defects may be detected while the downhole conveyance device is positioned on a spool.

In accordance with an alternative aspect of the disclosure, the above method may be implemented on unused downhole conveyance devices. In this embodiment, baseline defect data is obtained for the unused downhole conveyance devices. This baseline defect data may be used to rate the product as it is being provided from the supplier. This baseline defect data, however, may also be compared to one or more instances of used defect data that is obtained from the used downhole conveyance devices, and thus obtain the quality and types of defects caused by the use of the downhole conveyance device in the well system. Furthermore, the baseline defect data and used defect data may be entered, either manually or automatically, into a database to obtain a cumulative history of a health of the downhole conveyance devices over time, which is advantageous for many reasons.

The method, as described above, includes many advantages over traditional inspection methods. In one example, the method provides a means to inspect coated metal wire and new non-metallic wires that have little to no inspection methods available today. The method further provides 100% inspection coverage through the thickness of the wire structure (coating+core). Moreover, the method would allow wire inspection to be performed during manufacturing, receiving, in the shop, or at the rig site while running a job. Additionally, the method allows continuous inspection of the full length of the wire, which could prevent downtime due to broken wire or fishing operations because of the higher inspection frequency and level of inspection it allows compared to visual, mechanical, or eddy current methods. Moreover, it allows better monitoring of the health of the wire which could allow the wire to be run to its full useful life. The method would be less subjective than current visual methods, and inspection records could provide a life history for each spool.

The above-described method and systems, or at least a portion thereof, may be embodied in or performed by various (such as conventional), digital data processors or computers that are directed by executable programs of sequences of software instructions. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Aspects disclosed herein include:

A. A method for inspecting at least a portion of a downhole conveyance device, including providing a downhole conveyance device, providing an ultrasonic defect inspection system adjacent the downhole conveyance device, and detecting defects in the downhole conveyance device using the ultrasonic defect inspection system, wherein the detecting includes transmitting ultrasonic waves from the ultrasonic defect inspection system toward the downhole conveyance device obtaining defect data by sensing disruptions in reflected ultrasonic waves caused by defects in the downhole conveyance device.

Aspect A may have one or more of the following additional elements in combination:

Element 1: wherein transmitting ultrasonic waves toward the downhole conveyance device includes transmitting guided ultrasonic waves toward the downhole conveyance device thereby turning the downhole conveyance device into a waveguide. Element 2: wherein transmitting guided ultrasonic waves toward the downhole conveyance device includes transmitting guided ultrasonic waves toward the downhole conveyance device at an angle ($\alpha$) of at least about 10 degrees from perpendicular to a length (l) of the downhole conveyance device. Element 3: wherein transmitting guided ultrasonic waves toward the downhole conveyance device includes transmitting guided ultrasonic waves toward the downhole conveyance device at an angle ($\alpha$) of at least about 25 degrees from perpendicular to a length (l) of the downhole conveyance device. Element 4: wherein transmitting ultrasonic waves toward the downhole conveyance device includes transmitting substantially transverse ultrasonic waves toward the downhole conveyance device. Element 5: wherein detecting defects in the downhole conveyance device includes detecting defects in the downhole conveyance device at a rate upwards of about 30 meters/minute. Element 6: wherein detecting defects in the downhole conveyance device includes detecting defects in the downhole conveyance device at a rate upwards of about 75 meters/minute. Element 7: wherein detecting defects in the downhole conveyance device includes detecting defects in the downhole conveyance device while it is positioned on a spool. Element 8: wherein detecting defects in the downhole conveyance device includes detecting defects in an unused downhole conveyance device as part of a manufacturing process to obtain baseline defect data therefore. Element 9: wherein the baseline defect data is used to rate the unused downhole conveyance device. Element 10: further including using the downhole conveyance device in a well system, and then obtaining used defect data by transmitting ultrasonic waves from the ultrasonic defect inspection system toward the used downhole conveyance device and sensing disruptions in reflected ultrasonic waves caused by defects in the used downhole conveyance device. Element 10: further including comparing the baseline defect data to the used defect data to ascertain quantity and type of defects caused by using the downhole conveyance device in the well system. Element 11: further including entering the baseline defect data and one or more instances of used defect data into a database to obtain a cumulative history of a health of the downhole conveyance device. Element 12: wherein detecting defects in the downhole conveyance device using the ultrasonic defect inspection system may be conducted during the manufacturing process of the downhole conveyance device, when the downhole conveyance device is in a shop, or when the downhole conveyance device is tripping into or out of a well system. Element 13: wherein the downhole conveyance device is a slickline. Element 14: wherein the slickline is a metallic slickline or composite slickline. Element 15: wherein the metallic slickline is a coated metallic slickline. Element 16: wherein the coated metallic slickline is a thermoplastic coated metallic slickline. Element 17: wherein sensing disruptions in the reflected ultrasonic waves caused by defects in the downhole conveyance device includes sensing disruptions in the reflected ultrasonic waves caused by coating loss, coating debonding or longitudinal cracking in the coating in the downhole conveyance device. Element 18: wherein the composite slickline is a carbon fiber slickline. Element 19: wherein the carbon fiber slickline is a thermoplastic coated carbon fiber slickline.

Those skilled in the art to which this application relates will appreciate that other and further additions, deletions, substitutions and modifications may be made to the described embodiments.

What is claimed is:

1. A method for inspecting at least a portion of a downhole conveyance device, comprising:
    providing a downhole conveyance device;
    providing an ultrasonic defect inspection system adjacent the downhole conveyance device; and
    detecting defects in the downhole conveyance device using the ultrasonic defect inspection system, including:
        transmitting ultrasonic waves from the ultrasonic defect inspection system toward the downhole conveyance device; and
        obtaining defect data by sensing disruptions in reflected ultrasonic waves caused by defects in the downhole conveyance device.

2. The method of claim 1, wherein transmitting ultrasonic waves toward the downhole conveyance device includes transmitting guided ultrasonic waves toward the downhole conveyance device thereby turning the downhole conveyance device into a waveguide.

3. The method of claim 2, wherein transmitting guided ultrasonic waves toward the downhole conveyance device includes transmitting guided ultrasonic waves toward the downhole conveyance device at an angle ($\alpha$) of at least about 10 degrees from perpendicular to a length (l) of the downhole conveyance device.

4. The method of claim 2, wherein transmitting guided ultrasonic waves toward the downhole conveyance device includes transmitting guided ultrasonic waves toward the downhole conveyance device at an angle ($\alpha$) of at least about 25 degrees from perpendicular to a length (l) of the downhole conveyance device.

5. The method of claim 1, wherein transmitting ultrasonic waves toward the downhole conveyance device includes transmitting substantially transverse ultrasonic waves toward the downhole conveyance device.

6. The method of claim 1, wherein detecting defects in the downhole conveyance device includes detecting defects in the downhole conveyance device at a rate upwards of about 30 meters/minute.

7. The method of claim 1, wherein detecting defects in the downhole conveyance device includes detecting defects in the downhole conveyance device at a rate upwards of about 75 meters/minute.

8. The method of claim 1, wherein detecting defects in the downhole conveyance device includes detecting defects in the downhole conveyance device while it is positioned on a spool.

9. The method of claim 1, wherein detecting defects in the downhole conveyance device includes detecting defects in an unused downhole conveyance device as part of a manufacturing process to obtain baseline defect data therefore.

10. The method of claim 9, wherein the baseline defect data is used to rate the unused downhole conveyance device.

11. The method of claim 9, further including using the downhole conveyance device in a well system, and then obtaining used defect data by transmitting ultrasonic waves from the ultrasonic defect inspection system toward the used downhole conveyance device and sensing disruptions in reflected ultrasonic waves caused by defects in the used downhole conveyance device.

12. The method of claim 10, further including comparing the baseline defect data to the used defect data to ascertain quantity and type of defects caused by using the downhole conveyance device in the well system.

13. The method of claim 12, further including entering the baseline defect data and one or more instances of used defect data into a database to obtain a cumulative history of a health of the downhole conveyance device.

14. The method of claim 1, wherein detecting defects in the downhole conveyance device using the ultrasonic defect inspection system may be conducted during the manufacturing process of the downhole conveyance device, when the downhole conveyance device is in a shop, or when the downhole conveyance device is tripping into or out of a well system.

15. The method of claim 1, wherein the slickline is a metallic slickline or composite slickline.

16. The method of claim 15, wherein the metallic slickline is a coated metallic slickline.

17. The method of claim 16, wherein the coated metallic slickline is a thermoplastic coated metallic slickline.

18. The method of claim 16, wherein sensing disruptions in the reflected ultrasonic waves caused by defects in the downhole conveyance device includes sensing disruptions in the reflected ultrasonic waves caused by coating loss, coating debonding or longitudinal cracking in the coating in the downhole conveyance device.

19. The method of claim 15, wherein the composite slickline is a carbon fiber slickline.

20. The method of claim 19, wherein the carbon fiber slickline is a thermoplastic coated carbon fiber slickline.

* * * * *

UNITED STATES PATENT AND TRADEMARK OFFICE
CERTIFICATE OF CORRECTION

PATENT NO. : 11,428,670 B2  
APPLICATION NO. : 16/652285  
DATED : August 30, 2022  
INVENTOR(S) : Bryan D. Powell and Anthony Phan It is certified that error appears in the above-identified patent and that said Letters Patent is hereby corrected as shown below:

In the Specification

In Column 3, Line 20, after --conveyance device-- delete "28G." and insert --280.--

In Column 3, Line 44, after --conveyance device-- delete "260" and insert --280--

Signed and Sealed this
Eighth Day of November, 2022

Katherine Kelly Vidal  
*Director of the United States Patent and Trademark Office*